Patented Oct. 17, 1944

2,360,544

UNITED STATES PATENT OFFICE 2,360,544

DRILLING MUD

Donald C. Bond, Northbrook, Ill., assignor to The Pure Oil Company, Chicago, Ill., a corporation of Ohio No Drawing. Original application November 6, 1939, Serial No. 303,024. Divided and this application May 29, 1943, Serial No. 489,061

10 Claims. (Cl. 252—8.5)

This invention relates to drilling wells and is primarily concerned with the production of an improved drilling mud and composition for preparation thereof for use in the drilling of wells, especially oil and gas wells, and with the method of drilling wells wherein such muds are used. This application is a division of my co-pending application, Serial #303,024, filed November 6, 1939, entitled "Drilling mud."

Drilling operations are usually conducted in the presence of a circulation of mud, that is, water containing mineral matter such as clay in a finely divided or deflocculated state. Such drilling muds are used in almost all rotary drilling operations for deep wells for oil and gas and simultaneously serve several functions. The mud is used primarily to carry the cuttings from the hole and to lubricate the drill bit, and in addition provides a lining or sheath on the walls of the drill hole to prevent either flow of water or gas from the subsurface formation into the drill hole or to prevent loss of drilling fluid from the hole into the formations through which the hole is drilled. These muds are frequently made from material native to the formation in which the well is drilled, although it is often necessary to add additional material to the mud which will increase the specific gravity in order to increase the weight of the column of mud in the well and thereby offset the effect of high gas pressure. For this purpose weighting materials such as iron oxide and barytes are commonly used. Every natural clay contains particles of many orders of magnitude, some being coarse enough to settle out of a water suspension quickly and others being fine enough to stay suspended for indefinite periods. In a clay that is considered good for drilling purposes the fine material is predominant and is in an indefinitely fine state of subdivision, the finest being so small that much or most of it can be said to be in the form of a colloidal suspension or dispersion when the clay has been mixed with water. The suspended particles obey the general rules of colloidal dispersions, the degree of dispersion being increased by some ions and chemicals and being decreased by others. An increase in the degree of dispersion is termed "deflocculation" and a decrease in the state of dispersion is termed "flocculation." Flocculated clay may be in an equally finely divided state to that of deflocculated clay but the flocculated material will come together in flocculent, loose clumps or aggregates which settle readily from the medium in which it is dispersed, which in the case of drilling muds, is generally water. The stability of colloidal dispersions is also directly related to the charges on the dispersed particles. In general it may be said that strongly charged negative or positive particles form stable dispersions, whereas weakly charged or neutral particles tend to flocculate and settle out of the disperse medium.

When drilling in some formations such as, for example, certain shale formations, considerable difficulty has been experienced due to the property of these shale formations of swelling and sloughing when contacted with water or ordinary drilling mud. This property of some formations to hydrate or absorb water and swell sometimes occurs to such an extent that the holes cave and fill to such a degree that in the end the drilling has to be abandoned. Formations which have this property of absorbing water and swelling are, in the well drilling art, generally termed "heaving-shale" formations and it is with these types of formations that this invention is particularly concerned.

It is an object of this invention to provide an improved composition useful in the preparation of drilling mud.

It is another object of this invention to provide an improved drilling mud which will prevent the heaving of heaving-shale formations.

It is a still further object of this invention to provide a drilling mud in which the colloidal mineral content is dispersed as positively charged particles.

A further object of this invention is to provide an improved method for drilling in heaving-shale formations.

Various other objects and advantages will appear as the description of the invention proceeds.

Colloidally dispersed clay, obeying the general rules of colloidal dispersions, carries an electrical charge. Practically all naturally occurring finely divided clays such as kaolin and bentonite carry negative charges on the dispersed particles when dispersed in an aqueous medium. It is known that the shale in heaving-shale formation is generally bentonitic in character and that upon being dispersed in water carries a negative charge. It has now been found that if the colloidally dispersed particles, generally clay, in drilling muds are positively instead of negatively charged, the swelling of heaving-shale can be prevented or lessened to a great extent.

In the preparation of drilling mud it is generally desirable to use a finely divided solid which will have a high colloidal dispersion in water so as to produce a viscous, relatively stable mud with a minimum amount of solids. Bentonite has the aforesaid property and has been found to be a particularly satisfactory clay for use in drilling mud. Like other similar clays, bentonite carries a negative electrical charge when colloidally dispersed in an aqueous medium.

It has been found that such negatively charged colloids may be changed to positive colloids by the addition of one or more suitable water soluble chemical compounds from the group: salts of metals wherein the positive valence is three or more, such as thorium, aluminum, cerium and lanthanum salts; acid proteins such as acid gelatin or casein; basic dyes such as methylene blue, methylene green, methylene grey, methyl violet, Bismarck brown R, Rhodamine B, acriflavine, chrysoidin Y and chrysoidin R. By the addition of one or more of the foregoing materials, the negatively charged colloidal clay or bentonite may be first neutralized and flocculated and upon a further addition, the neutralized clay may be deflocculated and remain in a stable dispersed state as positively charged particles. It is not desirable to use the flocculated, neutralized particles in drilling mud since these particles are not stably dispersed, the particles readily settling from an aqueous dispersion medium. When such a positively charged clay as, for example, bentonite, is dispersed in water and used as drilling mud, the shale in heaving-shale formations does not swell or slough off into the hole and the bentonite particles remain stably dispersed. The ability of the positively charged bentonite to prevent swelling of the shale is believed to be due to neutralization of the negative charges on the shale particles in the subsurface formation by the positive charges on the bentonite in the drilling mud with resultant formation of a flocculated film of shale and bentonite on the exposed surface of the shale formation in the bore hole. The flocculated material forms an extremely coherent layer and adheres tightly to the surface of the formation, thus substantially preventing further neutralization of charges between the clay of the shale formation and the bentonite in the drilling mud and at the same time substantially preventing the ingress of further water to the formation, thereby preventing hydration and swelling of the heaving shale.

In order to better determine the effect of some of the preferred materials upon negatively charged aqueous colloidal dispersions, mixtures of several basic water soluble dyes and bentonite were tested by means of cataphoresis experiments. The Burton apparatus was employed in the test. This apparatus is well known for determining the electrical charge on colloid particles. The results of the tests are given in Table I:

TABLE I

| Mixture No. | Kind of dye | Cc. of 5% dye solution | Cc. of 5% bentonite suspension | Charge on colloid |
|---|---|---|---|---|
| 1 | None | 0 | 100 | Negative. |
| 2 | Methylene blue | 1 | 20 | Do. |
| 3 | do | 2 | 20 | Do. |
| 4 | do | 3 | 20 | Do. |
| 5 | do | 4 | 20 | None. |
| 6 | do | 7 | 20 | Do. |
| 7 | do | 10 | 20 | Do. |
| 8 | do | 15 | 20 | Positive. |
| 9 | do | 20 | 20 | Do. |
| 10 | do | 20 | 80 | Solid.[1] |
| 11 | do | 50 | 50 | Positive. |
| 12 | do | 50 | 50 | Do. |
| 13 | Malachite green | 50 | 50 | Slightly positive. |
| 14 | do | 80 | 20 | Do. |
| 15 | do | 67 | 33 | Positive. |
| 16 | Chrysoidin R | 50 | 50 | Do. |
| 17 | do | 75 | 25 | Do. |
| 18 | do | 25 | 75 | Solid.[1] |
| 19 | do | 5 | 20 | None. |
| 20 | do | 10 | 20 | Positive. |
| 21 | do | 50 | 20 | Slightly positive. |
| 22 | Methyl violet | 5 | 20 | None. |
| 23 | do | 10 | 20 | Positive. |
| 24 | do | 20 | 20 | Do. |
| 25 | do | 40 | 20 | Do. |
| 26 | do | 50 | 50 | Do. |
| 27 | do | 75 | 25 | Do. |
| 28 | do | 25 | 75 | Solid.[1] |
| 29 | do | 33 | 67 | Positive. |
| 30 | do | 40 | 60 | Do. |
| 31 | Bismarck brown R | 20 | 20 | Do. |
| 32 | do | 5 | 20 | None. |
| 33 | do | 10 | 20 | Positive. |
| 34 | do | 50 | 50 | Do. |
| 35 | do | 15 | 20 | Do. |
| 36 | do | 43 | 57 | Do. |
| 101 | Methylene green | 7.5 | 10 | None. |
| 102 | do | 10 | 10 | Positive. |
| 103 | do | 20 | 10 | Do. |
| 104 | Rhodamine B | 5 | 10 | Slightly positive. |
| 105 | do | 10 | 10 | Positive. |
| 106 | do | 20 | 10 | Do. |
| 107 | Chrysoidin Y | 1.5 | 1 | Slightly positive. |
| 108 | do | 2.0 | 1 | Do. |
| 109 | do | 4.0 | 1 | Do. |
| 110 | Methylene grey | 20 | 20 | None. |
| 111 | do | 30 | 20 | Do. |
| 112 | do | 40 | 20 | Slightly positive. |
| 113 | do | 80 | 20 | Positive. |
| 114 | do | 90 | 10 | Do. |
| 115 | Acriflavine | [2] 2.5 | 1 | Slightly positive. |
| 116 | do | [2] 5 | 1 | Positive. |
| 117 | do | [2] 10 | 1 | Do. |

[1] Unable to determine charge.
[2] 1% solution used.

In all of the examples shown in Table I, where the volume of dye solution plus the volume of bentonite solution was less than 100 cc., water was added to bring the mixture to this volume. From the results in Table I it will be seen that positive colloidal dispersions of bentonite may be readily formed by adding suitable quantities of methylene blue, chrysoidin R, methyl violet and Bismarck brown R to negatively charged, colloidally dispersed bentonite.

Samples of shale from heaving-shale formations encountered in actual drilling operations were obtained and the hydrating or swelling effect of the various colloidal dispersions listed in Table I, determined. When samples of these shales were placed in water or in drilling mud composed of the ordinary negatively charged bentonite dispersed in water, the shale swelled and disintegrated in a few hours, thereby conclusively showing that the sample was actually a heaving-shale type material and was readily susceptible to hydration. Other samples of the shale were placed in the various dye-bentonite mixtures listed in Table I.

TABLE II

| Mixture No. | Charge on colloid | Effect on heaving shale |
|---|---|---|
| Water | | Disintegrates in 3 hours. |
| 1 | Negative | Do. |
| 2 | do | Do. |
| 3 | do | Do. |
| 4 | do | Do. |
| 5 | None | Disintegrates in less than 12 hours. |
| 6 | do | Do. |
| 7 | do | Do. |
| 8 | Positive | Unchanged in 5 days. |
| 9 | do | Do. |
| 10 | (Solid) | |
| 11 | Positive | Unchanged in 5 days. |
| 12 | do | Do. |
| 13 | Slightly positive | Do. |
| 14 | do | Do. |
| 15 | Positive | Do. |
| 16 | do | Do. |
| 17 | do | Do. |
| 18 | (Solid) | |
| 19 | None | Disintegrates in less than 12 hours. |
| 20 | Positive | Unchanged in 5 days. |
| 21 | Slightly positive | Do. |
| 22 | None | Disintegrates in 2 days. |
| 23 | Positive | Unchanged in 5 days. |
| 24 | do | Do. |
| 25 | do | Do. |
| 26 | do | Do. |
| 27 | do | Do. |
| 28 | (Solid) | |
| 29 | Positive | Unchanged in 5 days. |
| 30 | do | Do. |
| 31 | do | Do. |
| 32 | None | Disintegrates in 2 days. |
| 33 | Positive | Unchanged in 5 days. |
| 34 | do | Do. |
| 35 | do | Do. |
| 36 | do | Do. |

The mixture numbers in Table II are the same mixtures as shown in Table I.

From a review of the results of Table II it will be seen that all of the mixtures tested in the cataphoresis experiments that showed particles carrying a negative charge or no charge at all, caused the heaving-shale samples to disintegrate comparatively rapidly. In those mixtures where the colloid was positively charged, the heaving-shale samples were unchanged after five days exposure, thus conclusively proving that positively charged colloidal, bentonitic mud containing basic dye will entirely prevent the swelling and hydrating of heaving shale.

Since it is frequently necessary to add weighting materials to drilling mud in order to increase the specific gravity and thereby provide a means of counteracting high gas pressures, it was considered advisable to determine whether or not stable, positively charged bentonite dispersions of high specific gravity could be prepared. Stability tests were carried out in the following manner: A 50 cc. sample of positively charged, weighted bentonitic mud containing barytes as the weighting agent, was poured into each of two 100 cc. graduates. After fifteen minutes the top 25 cc. in one graduate was weighed to determine the specific gravity of the mixture. After three days the specific gravity of the top 25 cc. of the other graduate was determined, a decrease in specific gravity in the second sample indicating that some of the weighting material had settled out. Table III shows the results of these tests:

TABLE III

Stability of dye-bentonite-water mixtures weighted with "Baroid-O"

| Mixture | Barite content of mixture | Original specific gravity | Sp. gr. of top 25 cc. after 3 days |
|---|---|---|---|
| | Grams | | |
| A | 60 | 1.29 | 1.18 |
| B | 80 | 1.40 | 1.39 |
| C | 100 | 1.50 | 1.49 |
| D | 20 | 1.11 | 1.07 |
| E | 40 | 1.21 | 1.20 |
| F | 60 | 1.39 | 1.25 |
| G | 80 | 1.48 | 1.34 |
| H | 100 | 1.57 | 1.46 |

Mixtures A, B and C were prepared by adding the designated amount of barite to 57 cc. of a 5% bentonite-water mixture to which had been added 43 cc. of a 5% solution of Bismarck brown dissolved in water. The remaining mixtures were prepared by adding the designated amount of barite to 50 cc. of a 5% bentonite-water mixture to which had been added 50 cc. of a 5% solution of methyl violet dissolved in water.

From the results of Table III it will be seen that the decrease in specific gravity of such mixtures after standing for three days is negligible. The results of these tests show that mixtures of positively charged bentonitic drilling mud containing dye and a weighting agent may readily be prepared and are entirely satisfactory from the standpoint of stability. The effect of diluting the weighted mixtures with oil well brine was also determined. It was found that the effect of the brine was no more serious on the weighted dye-bentonite mud suspensions than on ordinary drilling mud normally used. Since viscosity is also a very important characteristic of drilling mud, experiments were carried out to determine the various viscosity ranges in which weighted dye-bentonite mud could be prepared. Table IV shows the results of these experiments:

TABLE IV

Viscosity of weighted Bismarck brown R-bentonite-water mixtures

| Composition of mixture | Viscosity, march seconds [1] |
|---|---|
| 4.3% Bismarck brown R, 5.7% bentonite, 90% water + 1 g. barite/cc | 262 |
| 3.4% Bismarck brown R, 4.6% bentonite, 92% water + 0.8 g. barite/cc | 107 |
| 2.6% Bismarck brown R, 3.4% bentonite, 94% water + 0.6 g. barite/cc | 46 |
| 2.2% Bismarck brown R, 2.8% bentonite, 95% water + 0.5 g. barite/cc | 28 |

[1] 1500 cc. in funnel, time of flow of 1000 cc.

From the data of Table IV it will be seen that positively charged dye-bentonite muds may be prepared possessing practically any desired viscosity greater than that of water. From a large number of additional qualitative tests it has been found that the dye-bentonite mixtures also possess jell characteristics which may be varied over a wide range.

While various materials have been suggested herein as additives to drilling mud for changing negatively charged particles to positively charged particles, the invention is not limited to any particular material or method for effecting this change but includes the use of positively charged drilling mud by whatever means it is obtained. Although the principles of the invention may be applied in various ways, and the preferred materials used in widely varying quantities, it is preferred to use those water soluble materials such as salts of metals whose positive valence is three or more, acid proteins, or basic dyes in such quantities as will overcome the negative charge on the particles in bentonitic drilling muds and produce positively charged colloidally dispersed particles. The amount of additive required to produce positively charged particles may be readily determined by the Burton apparatus or other similar testing devices.

When two materials of opposite electrical charge react, the amount of each material which is affected is inversely proportional to the proportion of replaceable base which is present in a given weight of that type of particle. In view of the variations in the amount of replaceable base in the various dispersed particles such as bentonitic clays and in the varying degree of effectiveness with which the preferred materials impart positive charges to colloidally dispersed particles, it is apparent that the relative quantities used may vary over a rather wide range. The amount of the preferred material required may be readily determined by a cataphoresis test, an amount of additive being used which is somewhat in excess of the amount required to impart a positive charge to the dispersed particles. In general, the amounts of the preferred materials which are used fall between the ranges of one part of additive compound to ten parts of dry bentonite to three parts of additive compound to one part of dry bentonite. While the additive compound may be mixed with the bentonite in the dry state and the mixture subsequently dispersed in water as required, it is preferred to add the dye or other additive dry or dissolved in water to mud in which the bentonite is already dispersed.

The term "Bentonite" as used herein is used in a generic sense as including all clays having highly colloidal characteristics, whether they are true bentonite or not. In describing the preferred drilling mud additives as water soluble, it is not intended to limit the invention to those materials that are completely soluble in water but to include all materials within the groups indicated which are soluble or dispersible in water to a sufficient extent to produce deflocculated bentonitic muds having positively charged particles.

While an effort has been made to explain the theory by which the positively charged colloidal particles in drilling mud provide drilling mud which prevents the heaving of heaving-shale formations, it will be understood that the invention is not to be limited to any particular theory of operation.

It is claimed:

1. In the drilling of earth bores the step of circulating through the bore during the drilling operation an aqueous mud containing positively charged suspended particles to which the positive charge has been imparted by a basic dye selected from the group consisting of Rhodamine B, acriflavine, chrysoidin Y and R, methylene green and methylene grey added in sufficient quantity to impart a positive charge to said particles.

2. In the drilling of earth bores, the step of circulating through the bore during the drilling operation, aqueous mud containing normally negatively charged colloidally dispersed particles and sufficient basic dye selected from the group consisting of Rhodamine B, acriflavine, chrysoidin Y and R, methylene green and methylene grey to impart a positive charge to said particles.

3. In the drilling of earth bores, the step of circulating through the bore during the drilling operation an aqueous mud containing suspended bentonite and weighting material and sufficient basic dye selected from the group consisting of Rhodamine B, acriflavine, chrysoidin Y and R, methylene green and methylene grey to impart a positive charge to said particles.

4. A drilling mud comprising an aqueous suspension of normally negatively charged solid particles and sufficient basic dye selected from the group consisting of Rhodamine B, acriflavine, chrysoidin Y and R, methylene green and methylene grey, to impart a positive charge to said particles.

5. A drilling mud comprising an aqueous suspension of bentonite and sufficient basic dye selected from the group consisting of Rhodamine B, acriflavine, chrysoidin Y and R, methylene green and methylene grey to impart to the bentonite a positive charge.

6. A drilling mud in accordance with claim 5 containing barite.

7. A composition useful in the preparation of drilling muds comprising a mixture of bentonite and basic dye selected from the group consisting of Rhodamine B, acriflavine, chrysoidin Y and R, methylene green and methylene grey, the basic dye being present in amount sufficient to impart to the bentonite particles a positive charge when suspended in water.

8. A composition useful in the preparation of drilling mud comprising comminuted solid particles having a negative charge when suspended in water and sufficient basic dye selected from the group consisting of Rhodamine B, acriflavine, chrysoidin Y and R, methylene green and methylene grey to impart a positive charge to said particles when suspended in water.

9. Drilling mud in accordance with claim 5 in which the proportion of dye to bentonite is 1 to 3 parts of dye to 10 to 1 parts of bentonite.

10. A composition in accordance with claim 7 containing 1 to 3 parts of dye to 10 to 1 parts of bentonite.

DONALD C. BOND.